US010575680B2

(12) United States Patent
Fagg et al.

(10) Patent No.: US 10,575,680 B2
(45) Date of Patent: Mar. 3, 2020

(54) BRICK PIZZA OVEN WITH ROTATABLE AND HEIGHT ADJUSTABLE TURNTABLE AND CONVERSION KIT FOR GRILLS (71) Applicants: William Rowzee Fagg, Baltimore, MD (US); Walter Douglas Berry, Pensacola, FL (US)

(72) Inventors: William Rowzee Fagg, Baltimore, MD (US); Walter Douglas Berry, Pensacola, FL (US)

(*) Notice: Subject to any disclaimer, the term of this patent is extended or adjusted under 35 U.S.C. 154(b) by 376 days.

(21) Appl. No.: 15/439,932

(22) Filed: Feb. 22, 2017

(65) Prior Publication Data

US 2017/0238760 A1    Aug. 24, 2017

Related U.S. Application Data (60) Provisional application No. 62/298,140, filed on Feb. 22, 2016.

(51) Int. Cl.
*A47J 37/07*    (2006.01)

(52) U.S. Cl.
CPC ....... *A47J 37/0709* (2013.01); *A47J 37/0759* (2013.01); *A47J 37/0786* (2013.01)

(58) Field of Classification Search
CPC ............... A47J 37/0709; A47J 37/0759; A47J 37/0786; A47J 37/0658; A47J 37/745; A47J 37/658; A47J 2037/0795
USPC .................................................. 99/340, 422
See application file for complete search history.

(56) References Cited

U.S. PATENT DOCUMENTS

| 641,575 | A | 1/1900 | Boud |
|---|---|---|---|
| 898,527 | A | 9/1908 | Thoits |
| RE13,110 | E | 5/1910 | Thoits |
| 1,072,231 | A | 9/1913 | Howell |
| 1,404,808 | A | 1/1922 | Taylor |
| 2,019,604 | A | 11/1935 | Grieve |
| 2,072,036 | A | 2/1937 | Horsman |
| 2,641,243 | A | 6/1953 | Goss |
| 2,842,116 | A | 7/1958 | Hinderer |

(Continued)

FOREIGN PATENT DOCUMENTS

| GB | 345940 A | 3/1931 |
|---|---|---|
| GB | 627760 A | 8/1949 |
| WO | 2013/159018 A1 | 10/2013 |

*Primary Examiner* — Lorne E Meade
*Assistant Examiner* — Michael S. Poetzinger
(74) *Attorney, Agent, or Firm* — Intellent Patents LLC; Ahmed Alhafidh (57) ABSTRACT Disclosed is a portable brick pizza oven that may be prefabricated as such, or converted from a grill using a conversion kit. The portable brick pizza oven or converted grill utilizes a bottom plate as a mount for a height adjustment assembly that can be used to adjust the height of a rotatable turntable that is situated in a bowl. The turntable is connected to a driveshaft that extends down through the bowl, through a motor that rotates the driveshaft, and rests within the height adjustment assembly. The bowl is covered with a lid that has a number of bricks specifically placed such that the bricks are heated by a heating element situated within the bowl and facilitate the flow of convection currents throughout the portable brick pizza oven. The heating element heats the turntable and the bricks to a temperature that is suitable for baking pizzas in a similar fashion to that of a commercial pizza oven.

28 Claims, 8 Drawing Sheets

(56) References Cited

U.S. PATENT DOCUMENTS

| | | | | |
|---|---|---|---|---|
| 3,131,685 A | * | 5/1964 | Bergfield | A47J 37/0745 126/25 AA |
| 3,134,320 A | * | 5/1964 | Meyer | A47J 37/0745 126/25 AA |
| 3,299,800 A | | 1/1967 | Angelo | |
| 3,313,917 A | | 4/1967 | Ditzler et al. | |
| 3,657,996 A | | 4/1972 | Thompson | |
| 3,857,363 A | * | 12/1974 | Ferlito | B22F 3/003 118/300 |
| 3,952,721 A | | 4/1976 | Patterson | |
| 4,210,072 A | | 7/1980 | Pedrini | |
| 4,332,188 A | | 6/1982 | Rhear | |
| 4,378,729 A | | 4/1983 | Pierick | |
| 4,384,513 A | | 5/1983 | Pierick | |
| 4,437,396 A | | 3/1984 | Plattner et al. | |
| 4,455,319 A | | 6/1984 | Clark | |
| 4,467,709 A | | 8/1984 | Anstedt | |
| 4,498,376 A | | 2/1985 | Carey | |
| 4,656,337 A | | 4/1987 | Lastofka et al. | |
| 4,721,037 A | | 1/1988 | Blosnich | |
| 4,763,639 A | | 8/1988 | Goldsworthy | |
| 4,800,865 A | | 1/1989 | Selzer | |
| 4,889,103 A | | 12/1989 | Fraioli | |
| 4,962,696 A | | 10/1990 | Gillis | |
| 5,039,535 A | | 8/1991 | Lang et al. | |
| 5,097,753 A | | 3/1992 | Naft | |
| D344,871 S | | 3/1994 | Keller | |
| 5,315,922 A | | 5/1994 | Keller | |
| 5,365,833 A | | 10/1994 | Chen | |
| 5,413,033 A | | 5/1995 | Riccio | |
| 5,490,452 A | | 2/1996 | Schlosser et al. | |
| 5,532,456 A | | 7/1996 | Smith et al. | |
| 5,586,488 A | | 12/1996 | Liu | |
| 5,592,871 A | | 1/1997 | Bartlett | |
| 5,768,977 A | | 6/1998 | Parris | |
| 5,797,386 A | | 8/1998 | Orr | |
| 5,850,780 A | | 12/1998 | Mascia et al. | |
| 5,883,362 A | | 3/1999 | Pettibone et al. | |
| 5,996,572 A | * | 12/1999 | Ilagan | A47J 37/0786 126/21 A |
| 6,011,242 A | | 1/2000 | Westerberg | |
| 6,041,769 A | * | 3/2000 | Llodra, Jr. | A47J 37/0759 126/197 |
| 6,054,697 A | | 4/2000 | Woodward et al. | |
| RE36,724 E | | 6/2000 | Westerberg et al. | |
| 6,070,572 A | | 6/2000 | Casagrande | |
| 6,125,740 A | | 10/2000 | Hedrington et al. | |
| 6,187,359 B1 | | 2/2001 | Zuccarini | |
| 6,262,396 B1 | | 7/2001 | Witt et al. | |
| 6,354,194 B1 | | 3/2002 | Hedrington et al. | |
| 6,384,381 B2 | | 5/2002 | Witt et al. | |
| 6,425,388 B1 | | 7/2002 | Korinchock | |
| 6,615,819 B1 | | 9/2003 | Hernandez-Burgos | |
| 6,640,695 B2 | | 11/2003 | Stark | |
| 6,647,865 B2 | | 11/2003 | Holl | |
| 6,782,801 B1 | | 8/2004 | Correa et al. | |
| 6,967,036 B1 | | 11/2005 | Hedrington et al. | |
| 7,059,318 B2 | | 6/2006 | Cornfield | |
| 7,173,217 B2 | | 2/2007 | De'Longhi | |
| 7,219,663 B2 | | 5/2007 | Cuomo | |
| 7,686,010 B2 | | 3/2010 | Gustavsen | |
| D645,295 S | | 9/2011 | Klesath | |
| 8,578,927 B2 | | 11/2013 | Gustavsen | |
| 9,016,191 B2 | | 4/2015 | Krolick et al. | |
| 2002/0017290 A1 | | 2/2002 | Hines | |
| 2002/0060215 A1 | | 5/2002 | Allera et al. | |
| 2002/0069764 A1 | | 6/2002 | Cohen | |
| 2003/0145740 A1 | | 8/2003 | Stark | |
| 2005/0034716 A1 | | 2/2005 | Harbin | |
| 2005/0039612 A1 | | 2/2005 | Denny | |
| 2006/0102167 A1 | | 5/2006 | Driscoll, Jr. | |
| 2006/0191528 A1 | | 8/2006 | Spangrud | |
| 2009/0020111 A1 | | 1/2009 | Immordino | |
| 2009/0064872 A1 | | 3/2009 | Zisserson | |
| 2009/0078246 A1 | | 3/2009 | Leavens et al. | |
| 2010/0124596 A1 | | 5/2010 | Nelson | |
| 2011/0049125 A1 | | 3/2011 | Home | |
| 2011/0214662 A1 | | 9/2011 | Contarino | |
| 2012/0024171 A1 | | 2/2012 | Estes | |
| 2012/0164591 A1 | | 6/2012 | Chadwick et al. | |
| 2014/0053739 A1 | * | 2/2014 | Safar | A47J 37/0754 99/447 |
| 2014/0130788 A1 | | 3/2014 | Contarino | |
| 2014/0287119 A1 | * | 9/2014 | Dahle | F24C 15/16 426/520 |

* cited by examiner

ND HEIGHT ADJUSTABLE TURNTABLE
BRICK PIZZA OVEN WITH ROTATABLE AND HEIGHT ADJUSTABLE TURNTABLE AND CONVERSION KIT FOR GRILLS

CLAIM OF PRIORITY

This application claims priority to U.S. Provisional Patent Application Ser. No. 62/298,140, filed Feb. 22, 2016, the entire disclosure of which is hereby expressly incorporated by reference herein.

FIELD OF TECHNOLOGY

This disclosure relates generally to pizza ovens, barbecue grills and accessories and, more particularly, to a pizza oven grill conversion kit.

BACKGROUND

A brick oven typically bakes pizzas at temperatures ranging between 700 and 1000° F. (370 to 540° C.). Residential ovens are usually incapable of reaching higher than 500° F. In order to be able to enjoy a professionally baked pizza at home, a consumer may turn to a grill conversion kit. A pizza oven conversion kit for a grill typically involves adding parts to or modifying parts of a standard grill in an attempt to maintain an internal environment that mimics that of a pizza oven. Though grill conversion kits can in some cases achieve a high internal grill temperature, they fail to capture many key features of the pizza oven baking process.

Firstly, available pizza oven conversion kits fail to create the high sustained heat and thermal radiation patterns that are typically emitted in a brick oven. Heat distribution is key during the pizza cooking process, since a pizza is only cooked for a short time in a pizza oven (typically 2-3 minutes) due to high internal temperatures. Without proper heat emittance, a pizza may be cooked too slowly (and may become too dry), or too fast (and may become burnt or inedible), or unevenly (burnt in some spots, raw in others). Furthermore, available conversion kits do not provide ample configuration for adapting the grill to different weather conditions (e.g. wind, temperature, pressure, etc.) and often require a high degree of chef intervention to manipulate the pizza in order for it to evenly cook.

Current pizza oven conversion kits also fail to evenly heat both sides of the pizza (usually by underheating/overheating the crust and/or toppings). Current pizza oven conversion kits are also fuel inefficient and can only be used with certain types of grills or with certain types of fuel (such as charcoal).

SUMMARY

In one aspect, a pizza oven grill conversion kit for converting a grill into a pizza oven comprises a bottom plate coupled to one or more legs of the grill. The kit also comprises a lid comprising one or more bricks. The kit also comprises a turntable having an end of a driveshaft coupled to its underside. The driveshaft extends orthogonally away from the turntable and through the bottom of the bowl. The kit also includes a motor situated below the bowl. The driveshaft also extends through the motor. Operation of the motor causes the driveshaft and the turntable to rotate. The kit also includes a height adjustment assembly, which includes a cover. An end of the driveshaft opposite to that coupled to the turntable is housed in the cover. The height adjustment assembly includes a male-threaded rod having a top end rotatably disposed within the cover. A portion of the male-threaded rod is threadedly coupled to a female-threaded portion of the bottom plate. The male-threaded rod threads through the female-threaded portion when a rotational force acts upon the male-threaded rod. Rotation of the male-threaded rod causes the male-threaded rod to adjust the vertical position of the driveshaft.

In another aspect, a brick pizza oven comprises a bowl, a plurality of legs coupled to the bowl, and a bottom plate coupled to the plurality of legs. The oven also comprises a lid comprising one or more bricks, a bottom rim of which is configured to fit a top rim of the bowl. The oven also comprises a turntable having an end of a driveshaft coupled to its underside. The driveshaft extends orthogonally away from the turntable and through the bottom of the bowl. The oven also includes a motor situated below the bowl. The driveshaft also extends through the motor. Operation of the motor causes the driveshaft and the turntable to rotate. The oven also includes a height adjustment assembly, which includes a cover. An end of the driveshaft opposite to that coupled to the turntable is housed in the cover. The height adjustment assembly includes a male-threaded rod having a top end rotatably disposed within the cover. A portion of the male-threaded rod is threadedly coupled to a female-threaded portion of the bottom plate. The male-threaded rod threads through the female-threaded portion when a rotational force acts upon the male-threaded rod. Rotation of the male-threaded rod causes the male-threaded rod to adjust the vertical position of the driveshaft.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

REFERENCE LIST FOR DRAWINGS

X00—pizza oven grill
X02—lid

X04—bowl
X06—handle
X08—legs
X09—pizza stone
X10—wheel
X11—hose
X12—opening
X13—heating element
X14—mounts
X15—column of flame
X16—visor
X18—bottom plate
X20—height adjustment assembly
   X20a—cover
   X20b—receiving end
   X20c—solid divider
   X20d—end
   X20e—base
   X20e—male—threaded rod
   X20f—thrust washer
   X20g—thrust washer
   X20h—thrust bearing
   X20i—female insert
   X20j—handle
   X20k—pointed recess
X22—rotator assembly
X24—bricks
X26—plate
X28—bolt
X30—airspace
X32—gaps
X34—turntable
X36—pizza stone
X38—holding brackets
X40—driveshaft
X42—reinforcing bracket
X44—heat shield
X46—mounting plate
X48—screws
X50—motor
X52—bracket
X54—pizza

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 1A:
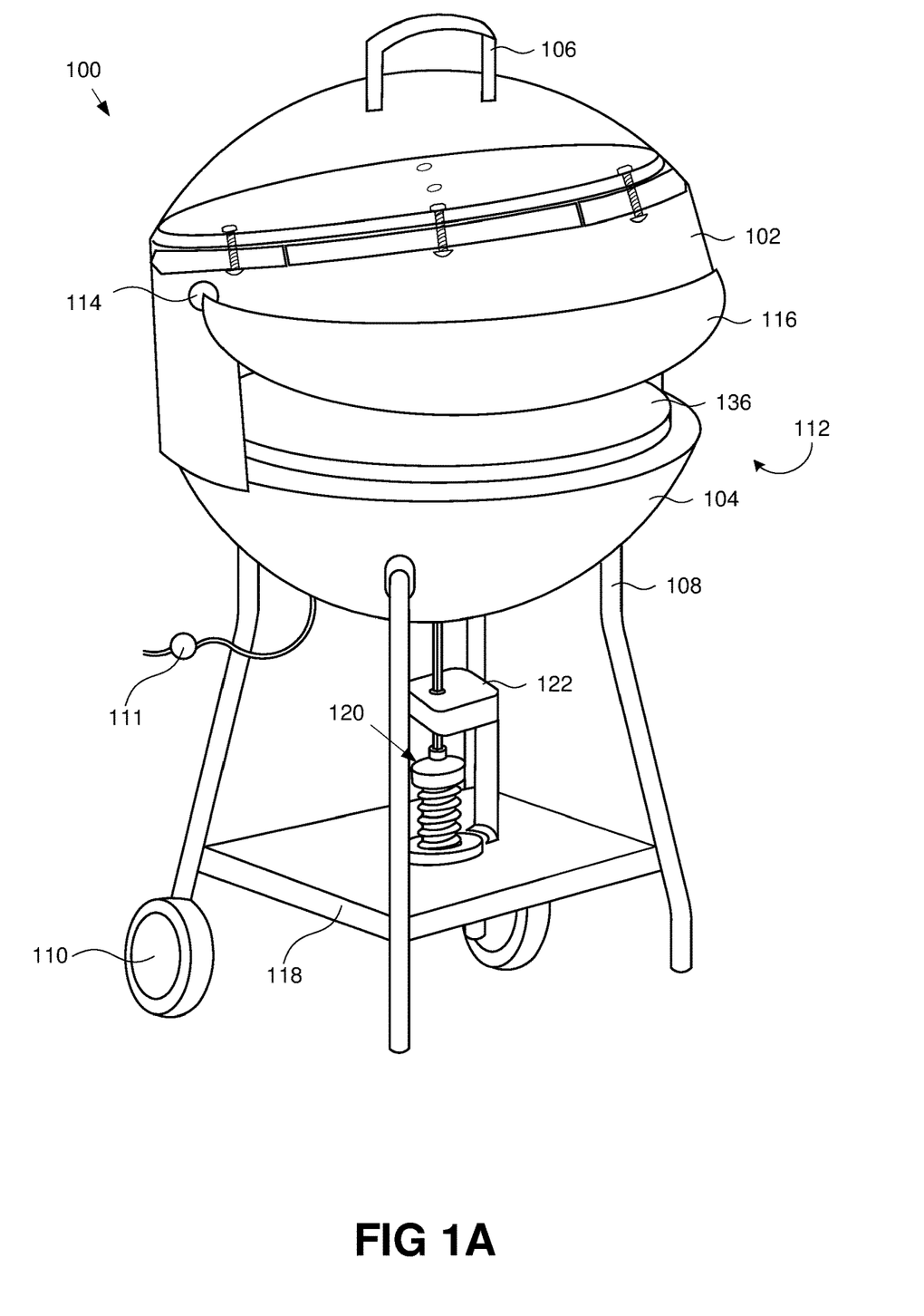
FIG. 1A is an illustration of a pizza oven grill made by converting a grill using a pizza oven conversion kit, according to one or more embodiments.

Referring to FIG. 1A, an illustration of a pizza oven grill 100 made by converting a grill using a pizza oven grill conversion kit is shown, according to one or more embodiments. A converted pizza oven grill 100 may be the result of converting a regular grill (e.g. a standard Weber® charcoal grill or other type of grill) by installing the components of a conversion kit sold separately from the grill. The converted grill may be subsequently reverted back to a regular grill by removing the components of the conversion kit and/or replacing the components with the original components of the grill.

Figure 1B:
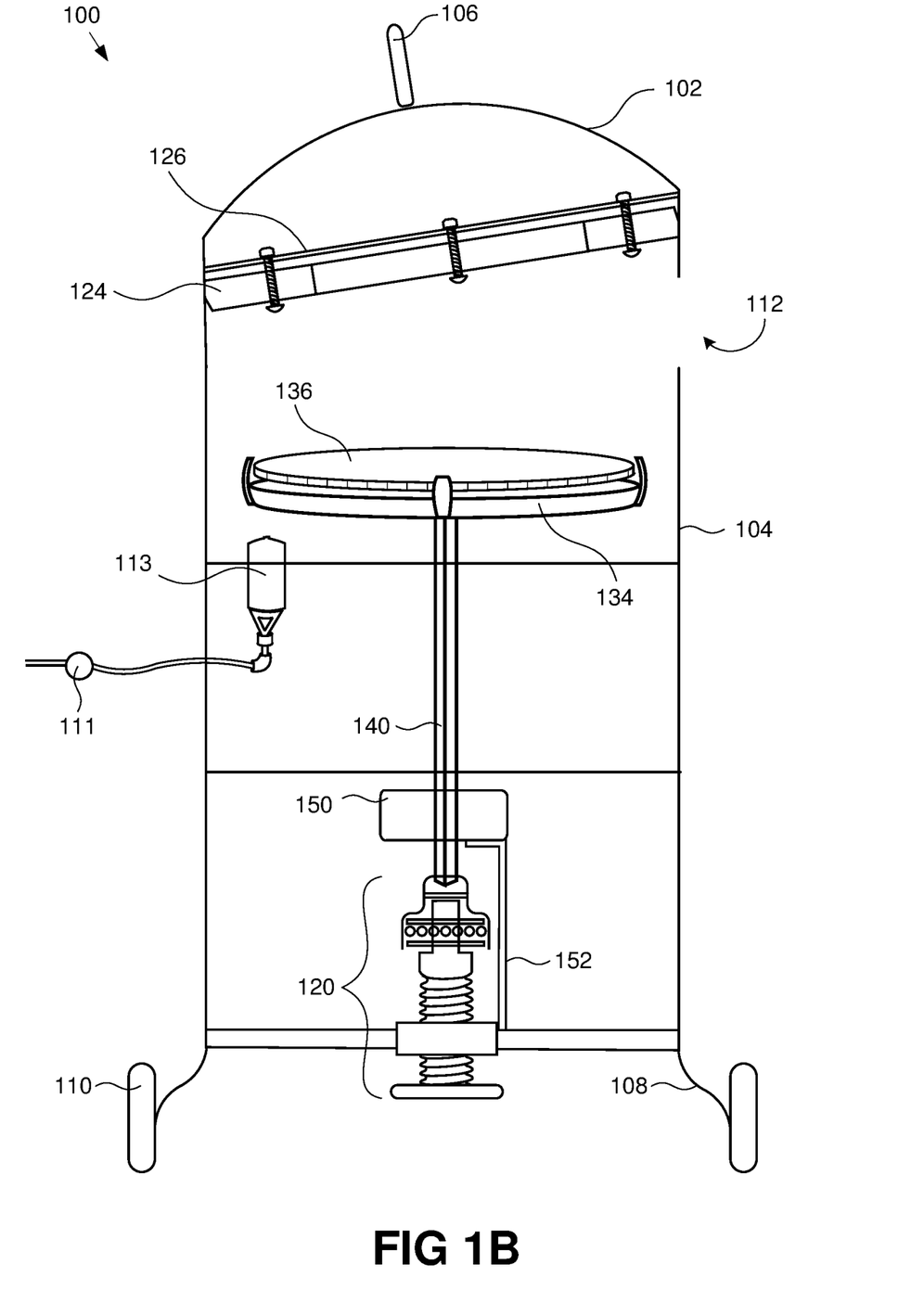
FIG. 1B is an illustration of a pre-built pizza oven, according to one or more embodiments.

In another embodiment, the pizza oven grill 100 may be manufactured and shipped as a pizza oven (i.e. a standalone, portable pizza oven 100 as illustrated in FIG. 1B). Whereas a converted grill may be suitable for household use, a standalone, portable pizza oven having one or more chambers (one of which is analogous to the bowl 104 and is heated by the heating element 113) according to the embodiments described herein may be more suitable for a commercial setting. Compared to a converted grill, a standalone, portable pizza oven may include components that last longer, perform more efficiently, and provide advanced features.

As such, the pizza oven grill 100 as illustrated in the drawings is meant to incorporate both a standalone, portable pizza oven and a converted grill. All details of the pizza oven grill 100 provided in the drawings are meant to interpreted in an illustrative, not a restrictive sense.

The pizza oven grill 100 comprises a lid 102 and a bowl 104. The lid may have a handle 106. The bowl 104 may comprise, among other components, a pizza stone 136. The bowl may be coupled to one or more legs 108. One or more of the one or more legs 108 may be coupled to a wheel 110, allowing the pizza oven grill 100 to be more easily moved. A bottom plate 118 may be coupled to one or more of the legs 108 and may be utilized as a base for a height adjustment assembly 120 and a rotator assembly 122. The height adjustment assembly 120 may be utilized to adjust the height of the pizza stone 136 within the bowl 104. The rotator assembly 122 may be utilized to rotate the pizza stone 136.

The pizza oven grill 100 shown in FIG. 1A may incorporate an internal or external heating element (not shown in FIG. 1), which may be provided fuel through a hose 111, the hose 111 having controls for regulating flow of fuel to a heating element and igniting the heating element. The opposite end of the hose 111 may originate from a fuel container holding fuel, such as propane, butane, or any other fuel that may cause the heating element to raise the internal temperature of the bowl 104 to a temperature that is suitable for baking pizzas, bread, and other similar foods.

In a preferred embodiment, the heating element may be housed internally within the bowl 104 and may use propane as fuel. The propane burner may provide around 110,000 BTUs of heat and may apply that heat directly or indirectly to one or more components of the pizza oven grill 100. A propane burner may be preferred in place of other fuels, such as charcoal, because a propane burner will more efficiently reach and maintain a temperature that is suitable for baking pizzas in a fuel-efficient and timely manner. For example, commercial pizza ovens typically cook pizzas within 2-3 minutes, which timing can be achieved using a propane burner. Combined with other key fuel-saving features, the pizza oven grill 100 may leave a smaller carbon footprint compared to available pizza oven grills.

The pizza oven grill 100 may be fashioned after other types of grills, such as a kamado grill, or may be a clay oven. Any type of material may be used for the lid 102, the bowl 104, or any other component of the pizza oven grill 100 and is within the scope of the exemplary embodiments described herein. Furthermore, any type of grill may be converted to a pizza oven grill by applying one or more modifications provided in a pizza oven grill conversion kit (not shown in the drawings). As such, any combination of the components or mechanisms described herein may be packaged as kits or parts for converting any grill to one that is ideal for reaching a high temperature rapidly and maintaining that high temperature for a sustained period while using little fuel.

In one embodiment, the lid 102 may be provided in a conversion kit and may be configured to retrofit the pizza oven grill 100. An original lid of the pizza oven grill may be positioned on top of the lid 102 to provide an insulating air space above the lid 102 (not shown in FIG. 1). As such, the lid 102 may be a an intermediate cover made of stainless steel, die-cast iron, or other suitable material and may be configured to fit on top of the bowl 104. For example, the bottom of the lid 102 may comprise a groove in which the top rim of the bowl 104 may fit. When placed upon the bowl 104 so that the groove fits on top of the rim, the lid 102 may fit snugly on the bowl 104.

A front portion of the lid 102 may comprise an opening 112 through which food may be inserted or withdrawn. On either side of the opening 112 may be mounts 114 for a visor 116 that may cover at least a portion of the opening 112 to prevent heat from escaping the internal chamber of the lid 102 and the bowl 104. The visor 114 may hinge at the mounts 114 and be tilted upwards to provide access to the internal chamber of the pizza oven grill 100 through the opening 112 (e.g. to retrieve a baked pizza, to clean the inner chamber, to regulate the internal temperature of the pizza oven grill 100).

The lid 102 may be physically designed to retain heat, prevent dissipation, and distribute heat throughout the material of the lid 102 to maintain a uniform internal temperature of the lid 102. In one embodiment, the top of the lid 102 may be tilted such that the back of the lid 102 (e.g. the side opposite the opening 112) is lower in height than the front of the lid 102 (e.g. the side incorporating the opening 112). This tilt may be ideal for maintaining an optimal internal environment in the pizza oven grill 100. The tilt achieves this by facilitating naturally-occurring thermal patterns and the flow of convection currents throughout the pizza oven grill 100. Since the opening 112 is in the front of the lid 102, heat rises and exits through the opening 112, but may be blocked by the visor 116. Adjusting the visor 116 to block the opening 112 may prevent heat from exiting the opening 112 whereas adjusting the visor 116 to expose the opening 112 may allow heat to escape.

Figure 2A:
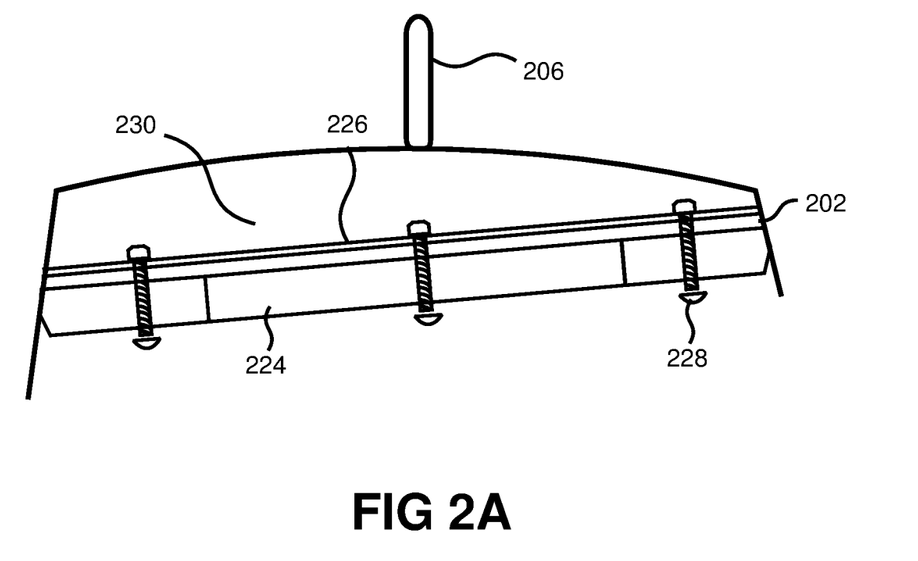
FIG. 2A is a cross section of a lid of the pizza oven grill of FIG. 1A, according to one or more embodiments.

Referring to FIG. 2A, a cross section of the lid 202 is shown. The lid 202 may comprise one or more bricks 224 mounted to a plate 226 coupled to the lid 202. The brick(s) 224 may be fire bricks or any brick made of ceramic, clay, or any other refractory material. Refractory ceramic is a preferred material for many heating chambers due to its ability to withstand high temperatures and its low thermal conductivity, which allows for superior energy efficiency. The brick(s) 224 may be bolted to the plate 226 with one or more bolts 228. There may be an air space 230 between the plate 226 and the top of the lid 202. The air space 230 may be insulating and may prevent the top of the lid 202 from reaching the same temperature as the internal chamber of the pizza oven grill 100 (e.g. around 900° F.). The airspace 230 may allow air to pass to and from the airspace through gaps between the bricks(s) 224 and/or through a vent of the lid 202 (not shown in the drawings).

The bricks 224 may be positioned diagonally across the span of the lid 202 (i.e. on one end, the bricks are higher than the bricks on the other end) in order to facilitate air flow around the bricks 224. The lower bricks may receive more direct heat and due to their geometry, there may be laminar flow from the lower bricks to the higher bricks. Though hot air reaching the higher bricks may escape through the front opening, the purpose of the visor is to prevent such escape and provide a variable covering that allows the user of the pizza oven grill to regulate heat flow throughout the pizza oven grill as needed.

Figure 2B:
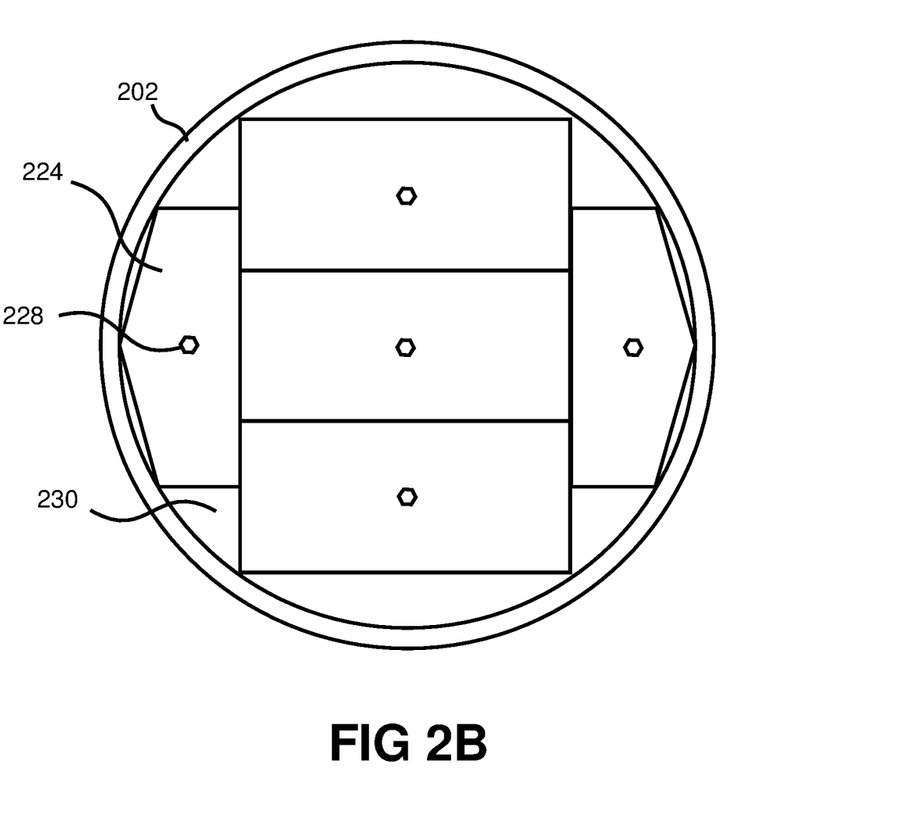
FIG. 2B is a bottom view of the lid of FIG. 2A, according to one or more embodiments.

Referring to FIG. 2B, a bottom view of the lid 202 is shown. The brick(s) 224 may be arranged so as to create gaps 232 between the bricks 224 and/or between the brick(s) 224 and the sides of the lid 202. In concert with the airspace 230, the gaps 232 may facilitate laminar flow of convection currents around the bricks 224.

Referring back to FIG. 1A, the opening 112 may allow ambient temperature air to flow into the pizza oven grill 100. Adjusting the visor 116 may regulate the influx of ambient temperature air and efflux of heated air. For example, raising the visor 116 may allow colder air to flow into the opening 112 and heated air may flow out of the opening 112. For example, during windy or wintry conditions, the visor 116 may be lowered and/or expanded to further limit influx of cold air into the pizza oven grill 100. Heated air may also flow out of an optional vent or other such opening elsewhere in the lid 102. For example, lowering the visor 116 may cause heated air to rise to the top of the lid 102 and heat the bricks 224. Heated air may also circulate through the airspace 230 and/or may be trapped in the airspace 230 if the visor 116 covers the opening 112.

Heat trapped in this way allows the brick(s) 224 to enter the range of temperatures critical for baking pizzas rapidly and efficiently. In a preferred embodiment, the opening 112 is approximately 65% of the height of the lid 102 to achieve optimal internal convection currents for cooking pizzas. Such an approximation would be understood by a person having ordinary skill in the art (PHOSITA) to be adjustable as needed to optimize heat transfer in pizza oven grills having different physical parameters (e.g. size of lid 102, volume of bowl 104, area of opening 112, area of the opening 112 coverable by visor 116, different heating element 113, different fuel).

An optimal height of the opening 112 may depend on any number of factors, including but not limited to the material of any component of the pizza oven grill 100, the ambient temperature surrounding the pizza oven grill 100, the thickness of the pizza being deposited in the pizza oven grill 100, the atmospheric pressure and humidity, the presence or absence of laminar flow within the pizza oven grill 100, and many other factors. As such, different configurations of the lid 102 (e.g. the differential height across the lid 102, the size of the opening 112, the implementation of the visor 116) may be contemplated and are within the scope of the embodiments described herein.

Figure 3A:
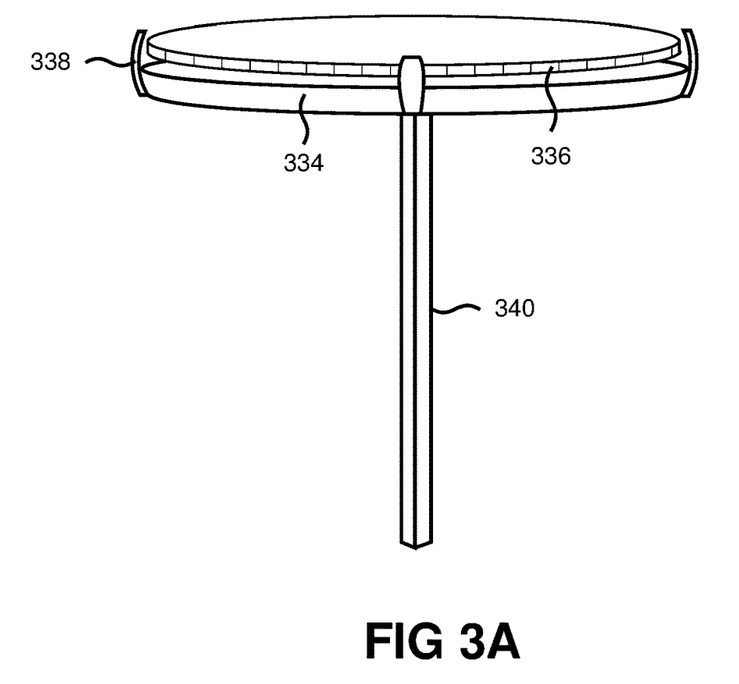
FIG. 3A is a side view of a turntable of the pizza oven grill of FIG. 1A, according to one or more embodiments.

Referring to FIG. 3A, a side view of a turntable 334 of the pizza oven grill 100 is shown. The pizza oven grill 100 comprises a turntable 334 upon which a pizza stone 336 (or similar surface) may be positioned. In one or more embodiments, the turntable 334 may be rotatably disposed within the bowl 104 such that the turntable 334 may be any shape and still rotate around a central vertical axis through the turntable 334. In another embodiment, the turntable 334 may be a flat, circular shelf comprising one or more holding brackets 338 coupled around the edge of the turntable 334. The pizza stone 336 is a ceramic plate upon which pizzas are typically cooked. The pizza stone 336 may be placed on the turntable 334 and may be held in place by the holding brackets 338. The holding brackets 338 may prevent the pizza stone 336 from falling (e.g. out of the pizza oven grill 100 or inside the pizza oven grill 100) and/or may prevent a pizza placed on the pizza stone 336 or ingredients of the pizza from dropping/dripping down the sides of the pizza stone 336 and creating a fire hazard.

Figure 3B:
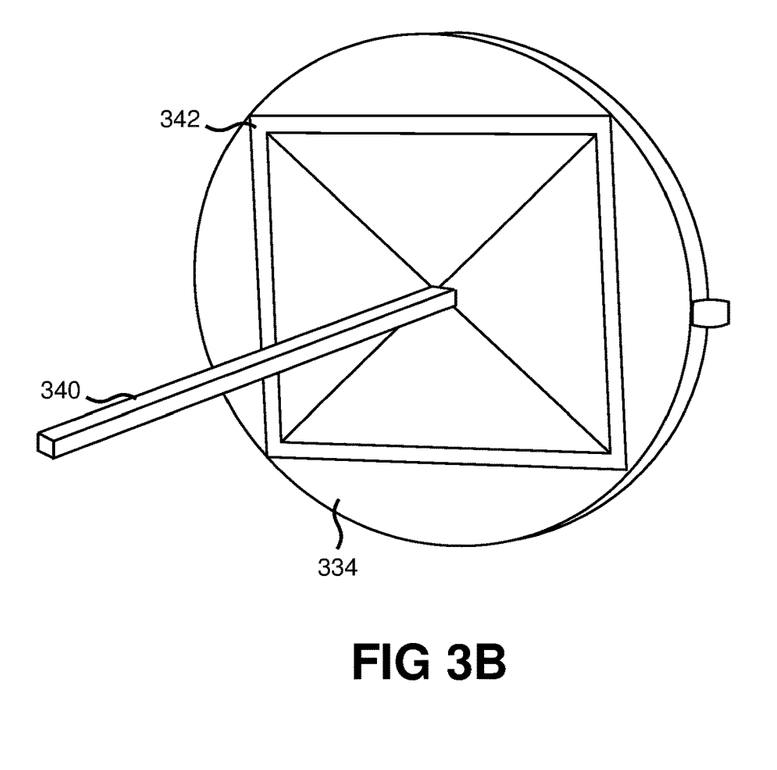
FIG. 3B is a perspective view of the turntable of FIG. 3A, according to one or more embodiments.

The turntable 334 may be coupled to a driveshaft 340. The driveshaft 340 may be orthogonally coupled to the center of the bottom side (or surface) of the turntable 334 and may extend away from the turntable 334. Referring to FIG. 3B, a bottom perspective view of the turntable 334 of FIG. 3A is shown, according to one or more embodiments. Alternately, the driveshaft 340 may be orthogonally coupled to a reinforcing bracket 342, which may be also coupled to the bottom surface of the turntable 300. The reinforcing bracket 342 may provide a more stable connection between the driveshaft 340 and the turntable 334. In one embodiment, the driveshaft 340 may be welded to the reinforcing bracket 342. In another embodiment, the driveshaft 340 and the reinforcing bracket 342 may couple through a male-female connection. A male-female connection may comprise a bolt and a threaded female hole, a clipping mechanism, a hooking mechanism, or another mechanism. Alternately, the driveshaft 340 may be coupled directly to the turntable 334 through a male-female connection. Other means of coupling the driveshaft 340 to the turntable 334 are contemplated and are within the scope of the exemplary embodiments described herein.

In one embodiment, the driveshaft 340 may have a square profile similar to that of a spit rod used in a typical rotisserie setup, in which the square profile of the driveshaft 340 fits through an aperture of a typical rotisserie motor and is acted upon by the motor to rotate the driveshaft 340. Alternately, the driveshaft 340 may have a triangular profile. In any case, the driveshaft 340 may comprise flat sides and may thus be used with a typical rotisserie motor to be rotated by the motor. In another embodiment, the driveshaft 340 may have a circular profile (or may otherwise have at least one curved side) and may comprise a vertical slit through which a member of the motor may pass. The member may be flush against the sides of the vertical slit and thus, operation of the motor may cause the member to rotate and subsequently cause the driveshaft 340 as well.

Figure 4:
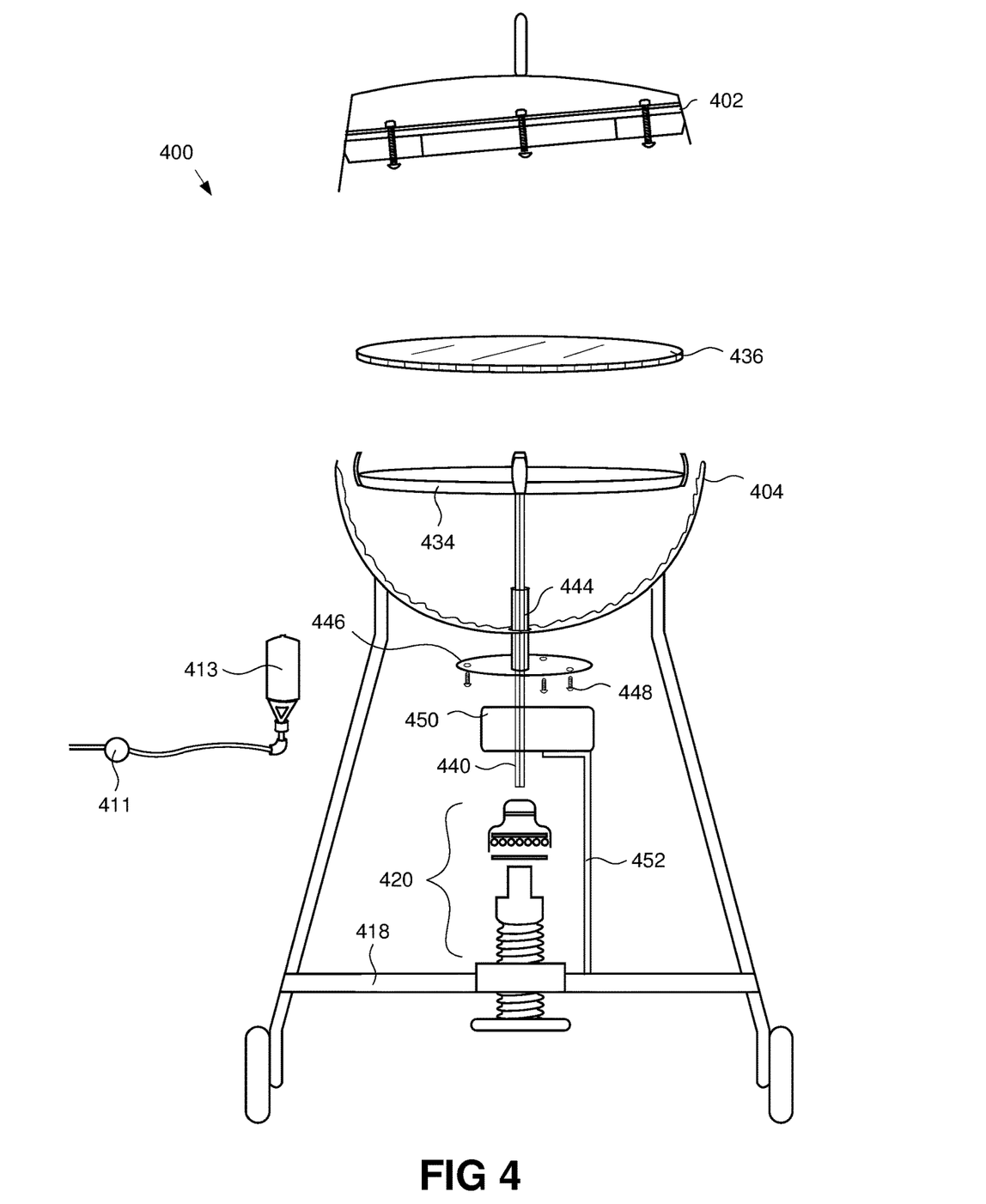
FIG. 4 is an exploded side view of the pizza oven grill of FIG. 1A, according to one or more embodiments.

Referring to FIG. 4, an exploded side view of the pizza oven grill 100 of FIG. 1A is shown, according to one or more embodiments. A heating element 413 is shown external to the bowl 404. The heating element 413 may an internal heating element housed within the bowl 404 or the heating element 413 may an external heating element that applies heat to the bowl 404.

The driveshaft 440 may extend down through the bowl 404 and through a mounting plate 446 coupled to the underside of the bowl 404. The mounting plate 446 may be welded to the bowl 404 or may be fastened to the bowl 404 by one or more screws 448. Where the driveshaft 440 extends past the underside of the bowl 404, the driveshaft 440 may be wrapped in a heat shield 444 to prevent the driveshaft 440 from conducting enough heat to the components outside of the bowl 404 so as to destroy or render non-functional said components. The heat shield 444 may be made of any insulating material.

The driveshaft 440 may further extend through a motor 450 and into the height adjustment assembly 420. The motor 450 may be suspended above the height adjustment assembly 420 by a bracket 452. The top end of the bracket 452 may be coupled to the underside of the motor 450 and the bottom end of the bracket 452 may be coupled to the bottom plate 418. The bracket 452 may slide into an enclosure of the motor 450, may be welded to the motor 450, or may couple to the motor 450 in other ways. In any case, the bracket 452 is of a sufficient length so as to suspend the motor 450 a distance away from the bowl 404 so as to prevent the internals of the motor 450 from being destroyed by heat emanating from the bowl 404 or heat conducted through the driveshaft 440.

Unlike most rotisserie motors, the motor 450 may allow the driveshaft 440 to extend through the motor 450. As such, the driveshaft 440 may be able to move back and forth through the aperture of the motor 450 and still be rotated by the motor 450. The end of the driveshaft 440 opposite to that coupled to the turntable 434 may sit within the height adjustment assembly 420.

Figure 5:
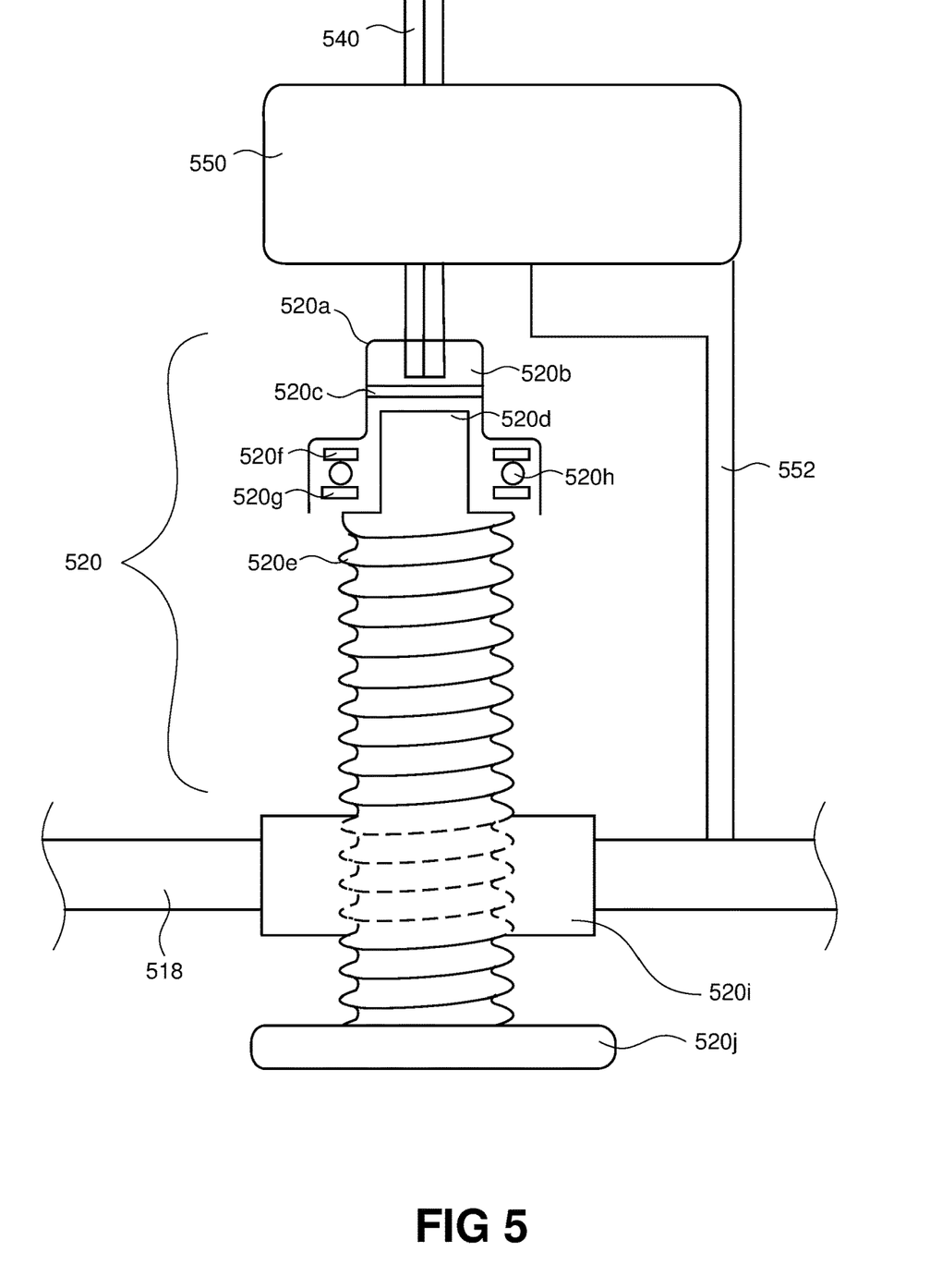
FIG. 5 is a side view of a height adjustment assembly of the pizza oven grill of FIG. 1A, according to one or more embodiments.

Referring to FIG. 5, a side view of the height adjustment assembly 520 is shown, according to one or more embodiments. The height adjustment assembly 520 allows for vertical adjustment of the turntable 534 (not pictured in FIG. 5). Adjusting the height of the turntable changes the position of the turntable relative to the internal bottom portion of the bowl and the bricks of the lid. As such, the height adjustment assembly 520 provides a mechanism for calibrating the pizza oven grill and ensuring a consistent cooking temperature and/or internal heat distribution in any environmental condition.

The height adjustment assembly 520 may comprise a cover 520a which may cover the components of the height adjustment assembly 520 and protect the components from oils or juices that may drip from the bowl 504 during operation of the pizza oven grill 500. The top of the cover 520a may comprise a receiving end 520b in which the driveshaft 540 may sit and rotate freely. Separating the receiving end 520b from the bottom of the height adjustment assembly 520 may be a solid divider 520c in which the end of the driveshaft 540 may be housed. Underneath the solid divider 520c, the cover 520a may receive an end 520d of a male-threaded rod 520e. The end 520d extrudes from the top of the male-threaded rod 520e. The end 520d extends through a washer-bearing assembly comprising a thrust washer 520f and a thrust washer 520g separated by a thrust bearing 520h. The washer-bearing assembly rests on the portion of the male-threaded rod 520e that surrounds the base of the end 520d. The male-threaded rod 520e may thread through a female insert 520i housed within the bottom plate 518. The bottom end of the male-threaded rod 520e may comprise a handle 520j that may be manually rotated to thread the male-threaded rod 520e through the female insert 520i (i.e. turning the handle 520j clockwise raises the driveshaft 540, turning the handle 520j counterclockwise lowers the driveshaft 540).

The height adjustment assembly 520 may be a robust means for height adjustment for the pizza oven grill 100. As shown in FIG. 5, the height adjustment assembly 520 may be extraordinarily sturdy and require very little maintenance. Since the height adjustment assembly 520 is protected from resinous build up by the cover 520a, the internal components (e.g. thrust washer 520f, thrust washer 520g, thrust bearing 520h) may operate normally without having to be lubricated often.

The handle 520j may provide a manual means for rotating the male-threaded rod 520e, but in an alternate embodiment, a motor may provide this function. The motor may be coupled to a user interface mounted on the pizza oven grill 500 that may provide controls for operating the motor and subsequently adjust the height of the turntable 334 (e.g. 'up' button, 'down' button).

The motor 550 may also comprise controls for operation of the motor 550. The motor 550 may also comprise a microcontroller and network interface and may thus be network-enabled (e.g. Bluetooth, WiFi™, etc.) and controllable remotely by a data processing device (e.g. a smartphone or personal computer). Through an app executed by the data processing device, the data processing device may display a number of parameters (e.g. RPM, torque rating, weight) generated by various sensors within the motor 550 or positioned in around other components of the pizza oven grill. The app may also provide a user interface for controlling a set of functions of the motor 550. The motor 550 may derive power from a 110V/220V outlet, a handcrank and dynamo charger, a thermo electric generator module, a Stirling engine, or a photovoltaic panel. Other sources of power (renewable or otherwise) may be used to provide power to the motor 550 and are within the scope of the exemplary embodiments described herein.

Figure 6:
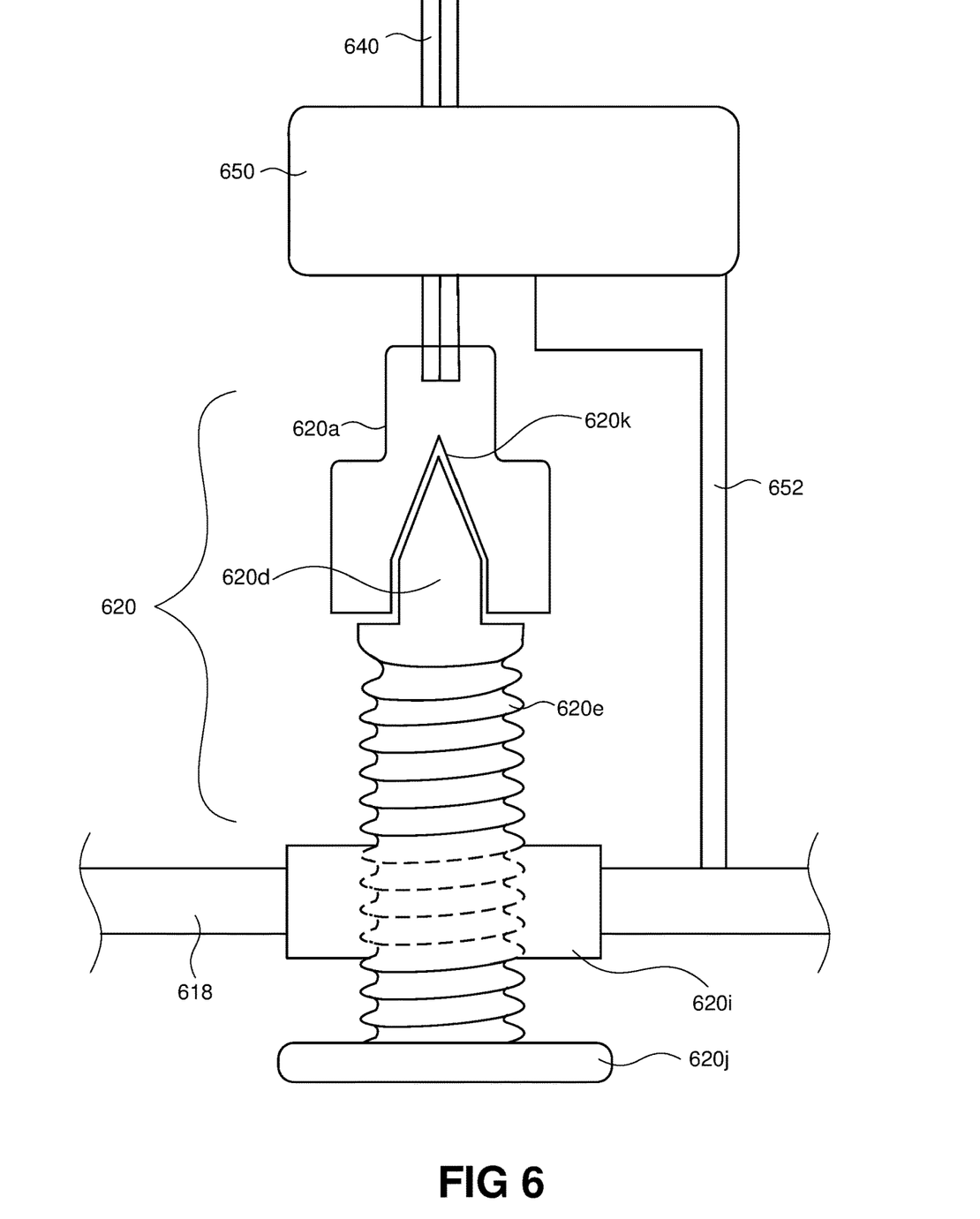
FIG. 6 is a side view of an alternate embodiment of the height adjustment assembly of FIG. 5.

Referring to FIG. 6, an alternate embodiment of a height adjustment assembly 620 is shown. In place of a washer-bearing assembly, the height adjustment assembly 620 may comprise a pivot point assembly in which a cover 620a of the height adjustment assembly 620 receives the driveshaft 640 through a top receiving end. The cover 620a also receives a pointed head 620d of the male-threaded rod 620e. The pointed head 620d may rest within a pointed recess 620k of the cover 620a. The tip of the pointed head 620d and the tip of the pointed recess 620k may create a pivot point. When the male-threaded rod 620e is rotated by manual or motor-driven rotation of the handle 620j, the pointed head 620d may rotate within the pointed recess 620k.

Though two embodiments of the height adjustment assembly 620 are shown, the height adjustment assembly 620 may be implemented in other ways. Such changes may be contemplated by a PHOSITA and are within the scope of the exemplary embodiments described herein.

Figure 7A:
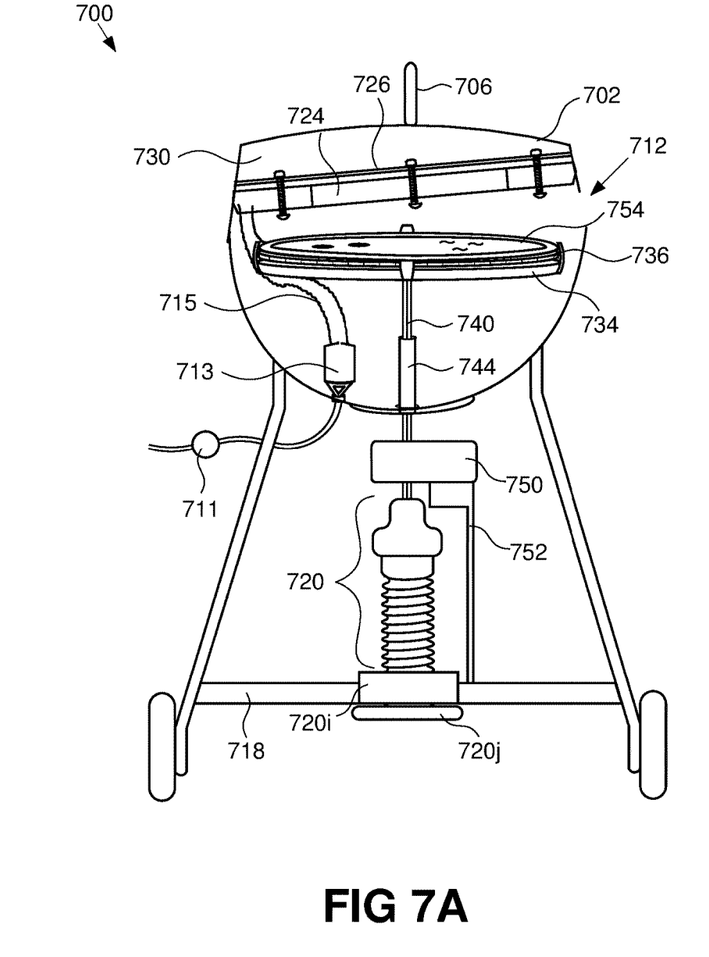
FIG. 7A is a side view of the pizza oven grill with the turntable in a raised position.

Referring to FIG. 7A, a side view of the pizza oven grill 700 with the turntable 734 in a raised position is shown. Operation of the pizza oven grill 700 may involve ignition of the heating element 713 through controls mounted on the hose 711 or coupled directly to the heating element. When ignited, the heating element 713 (e.g. a propane burner) may output enough BTUs to maintain a temperature of 500-1200° F. A high power burner, such a propane burner outputting 110,000 BTUs, may be capable of preheating the pizza oven grill 700 rapidly and cooking pizzas within an ideal 2-3 minutes time frame. When ignited, the burner 713 may generate a column of flame 715 that extends past the turntable 734 and towards the lid 702 of the pizza oven grill 700. The actual angle of the burner's output may be adjusted. In any case, the column of flame 715 may apply heat directly to the turntable 734 (which in turn may conduct heat to the pizza stone 736) and the bricks 724. Applying heat directly to the turntable 734 instead of directly to the pizza stone 736 may prevent the pizza stone 736 from cracking.

The column of flame 715 may proceed past the turntable 734 and may apply direct heat to the one or more bricks 724 of the lid 702. The one or more bricks 724 may be insulated by the plate 726 and the pizza stone 736 may be insulated by the turntable 734, causing the pizza oven grill 700 to retain heat between the one or more bricks 724 and the pizza stone 736.

The airspace 730 serves as an insulator for the plate 726 and the bricks 724. This effect is compounded if the exterior and/or interior sides of the lid 702 are coated with an insulator (e.g. an aluminum blanket, a fiberglass blanket or coating, etc.) This is a key safety feature that also contributes to improvements in fuel efficiency.

When the vertical height of the turntable 734 is changed by rotating the handle 720j of the height adjustment assembly 720, the vertical clearance between the pizza stone 736 and the bricks 724 may also change. Changing the vertical clearance between the pizza stone 736 and the bricks 724 may be necessary in order to ensure uniform heating between the top and bottom of a pizza 754. For example, if a user of the pizza oven grill 700 determines that the bottom of the pizza 754 is cooking more rapidly than the top of the pizza 754, the user may raise the turntable 734 to cook the top of the pizza 754 more rapidly and reduce the rate at which the bottom of the pizza 754 cooks.

Figure 7B:
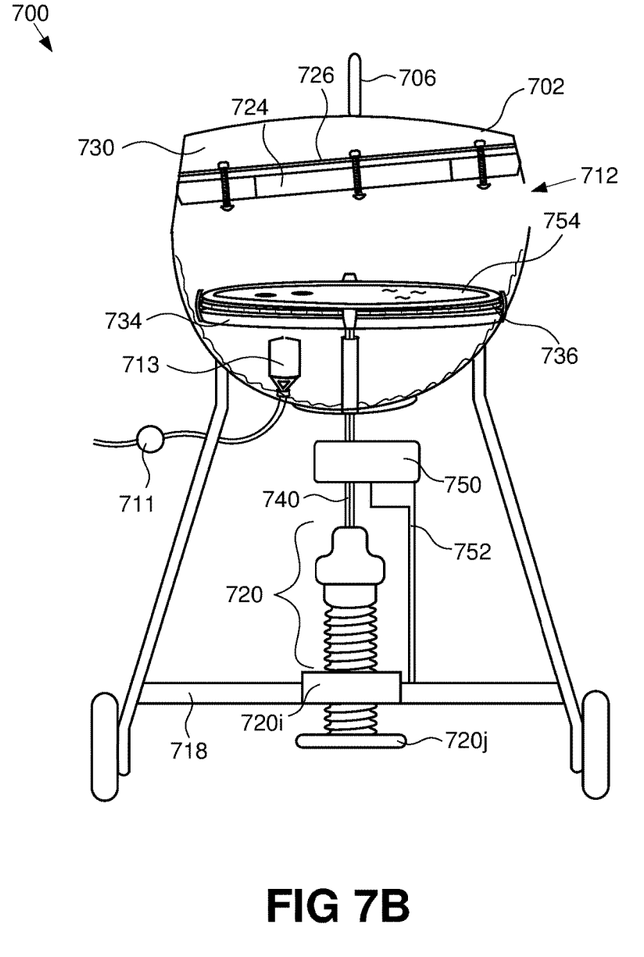
FIG. 7B is a side view of the pizza oven grill with the turntable in a lowered position.

Referring to FIG. 7B, a side view of the pizza oven grill 700 with the turntable 734 in a lowered position is shown, according to one or more embodiments. In order to prevent the column of flame from the burner 715 from being too concentrated on one portion of the turntable 734 and/or one portion of the bricks 724, the turntable 724 may be rotated by the action of the motor 750 on the driveshaft 740.

The driveshaft 740 may slide through the motor 750. The square profile of the driveshaft 740 may match the aperture of the motor 750 through which the driveshaft 740 is inserted. As shown in FIG. 7B, the pizza 754 may be rotated regardless of the vertical position of the turntable 734. Rotation of the turntable 734 may prevent warping of the various components of the pizza oven grill 700 that receive direct or indirect heat, such as the turntable 734, the pizza stone 736, the driveshaft 740, the bricks 724, the plate 726, the lid 702, the bowl 704, etc. Rotation may also ensure that all sections of the pizza 754 are baked evenly.

In one embodiment, rotation of the turntable 734 may be an automated process. For example, one or more high-temperature sensors placed throughout the pizza oven grill 700 may gather temperature readings which may be communicated to a data processing device of the pizza oven grill 700 or to a data processing device external to the pizza oven grill 700 and communicatively coupled to the one or more high-temperature sensors. The processor of the data processing device may aggregate the temperature readings and generate a three-dimensional heat map of the pizza oven grill 700. Based on the heat map, the data processing device may execute, through a processor of the data processing device, one or more instructions stored in a memory of the data processing device, to communicate a control signal to the motor 750 or a motor of the height adjustment assembly 720. The control signal may cause the motor 750 or motor of the height adjustment assembly 720 to turn on, change RPM, apply more/less torque, or execute other functions. Further instructions may be executed to analyze the heat map and determine an optimal RPM of the motor 750 or the motor of the height adjustment assembly 720.

In another embodiment, operation of the visor 716 (not shown in FIGS. 7A and 7B) may also be controlled by the data processing device. Referring back to FIG. 1, the mounts 114 to which the visor 116 is coupled may comprise a stepper motor or servo that may be operated through a control signal communicated by the data processing device. The stepper motor or servo may comprise a heat shield to prevent damage from heat. The stepper motor or servo may comprise means for monitoring the position of the visor based on the positioning of the stepper motor or servo. It would be appreciated by a PHOSITA that other mechanical means of determining positioning of the visor 116 are contemplated. For example, the positioning of the visor 116 could be determined by detecting voltage across a metal strip of the servo having variable resistance throughout the strip. Other methods of operating the visor 116 and determining its position are within the scope of the exemplary embodiments discussed here.

An optimal internal environment is achieved by vertically positioning the pizza stone 736 such that the pizza 754 on the pizza stone 736 receives enough heat from the bricks 724 (e.g. by radiation) and enough heat from the pizza stone 736 to cook the pizza 754 in 2-5 minutes, similar to a commercial oven. Unlike current systems, the pizza oven grill 700 comprises features that allow for quick and easy adaptation of the pizza oven grill 700 for different environmental condition (e.g. weather, wind, temperature, low/high humidity, low/high altitude and more). Available pizza oven grills or pizza oven grill conversion systems are not only severely limited, but also fail to emulate the internal environment of a pizza oven. These available pizza oven grills either lack the proper controls (for example, they do not support rotation or height adjustment and may not be able to get hot enough to bake pizzas), are difficult to use in a consistent manner, have not been tested for optimal use in different conditions, do not use refractory ceramic bricks or propane, and/or require significant user manipulation of the pizza in order to achieve minimally acceptable cooking results.

Although the present embodiments have been described with reference to specific example embodiments, it will be evident that various modifications and changes may be made to these embodiments without departing from the broader spirit and scope of the various embodiments. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

What is claimed is:

1. A pizza oven grill conversion kit for converting a grill into a pizza oven comprising:
   a bottom plate coupled to one or more legs of the grill;
   a lid comprising one or more bricks and a visor coupled to the lid, the visor configured to variably cover a portion of an opening of the lid;
   a turntable having an end of a driveshaft coupled to its underside, the driveshaft extending orthogonally away from the turntable and through the bottom of a bowl of the grill;
   a motor situated below the bowl, through which the driveshaft also extends, wherein operation of the motor causes the driveshaft and the turntable to rotate; and
   a height adjustment assembly comprising a cover, wherein an end of the driveshaft opposite to that coupled to the turntable is housed in a receiving end of the cover, the height adjustment assembly comprising:
   a male-threaded rod having a top end rotatably disposed within the cover,
      wherein a portion of the male-threaded rod is threadedly coupled to a female-threaded portion of the bottom plate,
      wherein the male-threaded rod threads through the female-threaded portion when a rotational force acts upon the male-threaded rod,
      wherein rotation of the male-threaded rod causes the male-threaded rod to adjust the vertical position of the driveshaft,
   wherein the top of the top end of the male-threaded rod is pointed and a recess of the cover within which the top end is rotatably disposed is complementarily pointed such that when coupled, the top end and the recess create a pivot point around which the cover may rotate.

2. The pizza oven grill conversion kit of claim 1, wherein the one or more bricks are made of a refractory material.

3. The pizza oven grill conversion kit of claim 1, wherein at least the portion of the driveshaft extending through the motor comprises at least one flat side and is acted upon during operation of the motor.

4. The pizza oven grill conversion kit of claim 1, wherein at least the portion of the driveshaft passing through the bowl of the grill is covered by a heat shield.

5. The pizza oven grill conversion kit of claim 1, wherein the turntable comprises one or more holding brackets around the perimeter of the turntable, the one or more holding brackets positioned to prevent an object placed on the turntable from falling over the edge of the turntable.

6. The pizza oven grill conversion kit of claim 1, further comprising a heating element configured to provide direct heat to at least one of the group consisting of: the turntable, the one or more bricks, and a pizza stone placed on the turntable.

7. The pizza oven grill conversion kit of claim 1, wherein the lid comprises an airspace between the one or more bricks and the top of the lid to insulate the one or more bricks and prevent the top of the lid from reaching hazardous temperatures.

8. A portable pizza oven comprising:
   one or more chambers, one of which is a heated chamber;
   a plurality of legs extending from a bottom chamber;
   a bottom plate coupled to the plurality of legs;
   a lid comprising one or more bricks, a bottom rim of which is configured to fit a top rim of the heated chamber,
      wherein the lid also comprises a visor coupled to the lid, the visor configured to variably cover a portion of an opening of the lid;

a turntable having an end of a driveshaft coupled to its underside, the driveshaft extending orthogonally away from the turntable and through the bottom of the heated chamber;

a motor situated below the heated chamber, through which the driveshaft also extends, wherein operation of the motor causes the driveshaft and the turntable to rotate; and a height adjustment assembly comprising a cover, wherein an end of the driveshaft opposite to that coupled to the turntable is housed in a receiving end of the cover, the height adjustment assembly comprising:

a male-threaded rod having a top end rotatably disposed within the cover, wherein a portion of the male-threaded rod is threadedly coupled to a female-threaded portion of the bottom plate, wherein the male-threaded rod threads through the female-threaded portion when a rotational force acts upon the male-threaded rod, wherein rotation of the male-threaded rod causes the male-threaded rod to adjust the vertical position of the driveshaft, wherein the top of the top end of the male-threaded rod is pointed and a recess of the cover within which the top end is rotatably disposed is complementarily pointed such that when coupled, the top end and the recess create a pivot point around which the cover may rotate.

9. The oven of claim 8, wherein the one or more bricks are made of a refractory material.

10. The oven of claim 8, wherein at least the portion of the driveshaft extending through the motor comprises at least one flat side and is acted upon during operation of the motor.

11. The oven of claim 8, wherein at least the portion of the driveshaft passing through the heated chamber of the oven is covered by a heat shield.

12. The oven of claim 8, wherein the turntable comprises one or more holding brackets around the perimeter of the turntable, the one or more holding brackets positioned to prevent an object placed on the turntable from falling over the edge of the turntable.

13. The oven of claim 8, further comprising a heating element configured to provide direct heat to at least one of the group consisting of: the turntable, the one or more bricks, and a pizza stone placed on the turntable.

14. The oven of claim 8, wherein the lid comprises an airspace between the one or more bricks and the top of the lid to insulate the one or more bricks and prevent the top of the lid from reaching hazardous temperatures.

15. A pizza oven grill conversion kit for converting a grill into a pizza oven comprising:

a bottom plate coupled to one or more legs of the grill;

a lid comprising one or more bricks and a visor coupled to the lid, the visor configured to variably cover a portion of an opening of the lid;

a turntable having an end of a driveshaft coupled to its underside, the driveshaft extending orthogonally away from the turntable and through the bottom of a bowl of the grill;

a motor situated below the bowl, through which the driveshaft also extends, wherein operation of the motor causes the driveshaft and the turntable to rotate; and a height adjustment assembly comprising a cover, wherein an end of the driveshaft opposite to that coupled to the turntable is housed in a receiving end of the cover, the height adjustment assembly comprising:

a male-threaded rod having a top end rotatably disposed within the cover, wherein a portion of the male-threaded rod is threadedly coupled to a\ female-threaded portion of the bottom plate, wherein the male-threaded rod threads through the female-threaded portion when a rotational force acts upon the male-threaded rod, wherein rotation of the male-threaded rod causes the male-threaded rod to adjust the vertical position of the driveshaft, wherein the top end of the male-threaded rod comprises:

a base upon which a thrust bearing assembly of the cover rests, wherein the thrust bearing assembly comprises a thrust bearing surrounded by thrust washers on either side; and a protruding member extending past the base and through the thrust bearing assembly upon which a solid divider of the cover rests, wherein the driveshaft rests on the solid divider, wherein the cover allows the driveshaft to be rotated freely within the receiving end and the thrust bearing assembly rests on the base of the male-threaded rod.

16. The pizza oven grill conversion kit of claim 15, wherein the one or more bricks are made of a refractory material.

17. The pizza oven grill conversion kit of claim 15, wherein at least the portion of the driveshaft extending through the motor comprises at least one flat side and is acted upon during operation of the motor.

18. The pizza oven grill conversion kit of claim 15, wherein at least the portion of the driveshaft passing through the bowl of the grill is covered by a heat shield.

19. The pizza oven grill conversion kit of claim 15, wherein the turntable comprises one or more holding brackets around the perimeter of the turntable, the one or more holding brackets positioned to prevent an object placed on the turntable from falling over the edge of the turntable.

20. The pizza oven grill conversion kit of claim 15, further comprising a heating element configured to provide direct heat to at least one of the group consisting of: the turntable, the one or more bricks, and a pizza stone placed on the turntable.

21. The pizza oven grill conversion kit of claim 15, wherein the lid comprises an airspace between the one or more bricks and the top of the lid to insulate the one or more bricks and prevent the top of the lid from reaching hazardous temperatures.

22. A portable pizza oven comprising:

one or more chambers, one of which is a heated chamber;

a plurality of legs extending from a bottom chamber;

a bottom plate coupled to the plurality of legs;

a lid comprising one or more bricks, a bottom rim of which is configured to fit a top rim of the heated chamber, wherein the lid also comprises a visor coupled to the lid, the visor configured to variably cover a portion of an opening of the lid;

a turntable having an end of a driveshaft coupled to its underside, the driveshaft extending orthogonally away from the turntable and through the bottom of the heated chamber;

a motor situated below the heated chamber, through which the driveshaft also extends, wherein operation of the motor causes the driveshaft and the turntable to rotate; and a height adjustment assembly comprising a cover, wherein an end of the driveshaft opposite to that coupled to the turntable is housed in a receiving end of the cover, the height adjustment assembly comprising:

a male-threaded rod having a top end rotatably disposed within the cover,
- wherein a portion of the male-threaded rod is threadedly coupled to a female-threaded portion of the bottom plate,
- wherein the male-threaded rod threads through the female-threaded portion when a rotational force acts upon the male-threaded rod,
- wherein rotation of the male-threaded rod causes the male-threaded rod to adjust the vertical position of the driveshaft,
- wherein the top end of the male-threaded rod comprises:
  - a base upon which a thrust bearing assembly of the cover rests, wherein the thrust bearing assembly comprises a thrust bearing surrounded by thrust washers on either side; and
  - a protruding member extending past the base and through the thrust bearing assembly upon which a solid divider of the cover rests, wherein the driveshaft rests on the solid divider, wherein the cover allows the driveshaft to be rotated freely within the receiving end and the thrust bearing assembly rests on the base of the male-threaded rod.

23. The oven of claim 22, wherein the one or more bricks are made of a refractory material.

24. The oven of claim 22, wherein at least the portion of the driveshaft extending through the motor comprises at least one flat side and is acted upon during operation of the motor.

25. The oven of claim 22, wherein at least the portion of the driveshaft passing through the heated chamber of the oven is covered by a heat shield.

26. The oven of claim 22, wherein the turntable comprises one or more holding brackets around the perimeter of the turntable, the one or more holding brackets positioned to prevent an object placed on the turntable from falling over the edge of the turntable.

27. The oven of claim 22, further comprising a heating element configured to provide direct heat to at least one of the group consisting of: the turntable, the one or more bricks, and a pizza stone placed on the turntable.

28. The oven of claim 22, wherein the lid comprises an airspace between the one or more bricks and the top of the lid to insulate the one or more bricks and prevent the top of the lid from reaching hazardous temperatures.

* * * * *